United States Patent [19]

Takase et al.

[11] Patent Number: 4,917,846
[45] Date of Patent: Apr. 17, 1990

[54] METHOD OF MANUFACTURING A PLURALITY OF ROTATIONAL MEMBERS

[75] Inventors: Hironori Takase, Kawasaki; Shigeru Kamata, Tokyo, both of Japan

[73] Assignee: Canon Kabushiki Kaisha, Tokyo, Japan

[21] Appl. No.: 185,266

[22] Filed: Apr. 18, 1988

Related U.S. Application Data

[63] Continuation of Ser. No. 862,660, May 13, 1986, abandoned.

[30] Foreign Application Priority Data

May 21, 1985 [JP] Japan ............................... 60-109056
May 22, 1985 [JP] Japan ............................... 60-109637
May 7, 1986 [JP] Japan ............................... 61-104315

[51] Int. Cl.$^4$ ............................................. B29C 45/44
[52] U.S. Cl. ..................... 264/130; 264/242; 264/317; 249/59; 425/572; 425/577; 425/588
[58] Field of Search ............ 264/242, 317, 221; 249/59; 425/572, 577, 588

[56] References Cited

U.S. PATENT DOCUMENTS

| | | | |
|---|---|---|---|
| 2,548,353 | 4/1951 | Cunningham | 264/317 |
| 3,061,887 | 11/1962 | Clarke | 264/317 |
| 3,081,644 | 3/1963 | Hudgens | 264/242 |
| 3,616,520 | 11/1971 | Bucalo | 264/317 |
| 4,385,023 | 5/1983 | Sumi | 264/242 |
| 4,535,518 | 8/1985 | Jaqua | 264/317 |

*Primary Examiner*—Jay H. Woo
*Assistant Examiner*—Jeremiah F. Durkin, II
*Attorney, Agent, or Firm*—Fitzpatrick, Cella, Harper & Scinto

[57] ABSTRACT

A plurality of rotational members which comprise an inner shell and an outer shell rotatable relative to each other and in which a soluble film is fixed to the inner periphery or the outer periphery of one of the shells, the shell with the soluble film fixed thereto is the shaping mold of a molding machine for molding the other shell, and a plurality of rotational members comprising an inner shell and an outer shell are molded through the soluble film, whereafter the soluble film is dissolved and removed.

5 Claims, 12 Drawing Sheets

METHOD OF MANUFACTURING A PLURALITY OF ROTATIONAL MEMBERS

This application is a continuation of application Ser. No. 862,660, filed May 13, 1986, now abandoned.

BACKGROUND OF THE INVENTION

1. Field of the Invention

This invention relates to a method of manufacturing a pair of or more rotational members such as a male shell and a female shell, for example, lens barrel units.

2. Related Background Art

In a unit shell comprising a pair of male shell and female shell which is used in a camera lens barrel, optical accuracy and physical accuracy such as moderate operation weight are required when the male shell and the female shell are repeatedly moved relative to each other. For the structure of parts for satisfying these requirements, it is necessary to form a minute gap between the male shell and the female shell.

As a method of forming such gap in manufacturing a unit shell comprising a pair of male shell and female shell by a molding process, there has heretofore been adopted a method of utilizing the molding contraction of resin as disclosed in U.S. Pat. No. 4,115,505. It comprises making in advance a female shell which is an outer shell, and then mounting and holding the female shell in a shaping mold for a male shell which is an inner shell, thereafter pouring resin into the mold to thereby form the male shell, thus manufacturing a unit shell comprising a pair of male and female shells. In this case, the male shell molding-contracts, whereby a minute gap is formed between the male shell and the female shell. Such prior art, however, has suffered from the following disadvantages.

Firstly, as long as an attempt is made to create a gap by utilizing molding contraction, the procedure of molding a male shell on the basis of a female shell is unavoidable. That is, the male shell is formed of a resin material and a metal material cannot be used for the male shell. Therefore, it has been unreasonable to apply the prior art to a male shell which requires strength of the member itself, such as a thin-walled and long male shell indicated by 1 in FIG. 1 of the accompanying drawings or a short-diametered and elongated male shell indicated by 1 in FIG. 9 of the accompanying drawings.

Secondly, when an attempt is made to make a female shell by resin molding, undercutting of the bore of a female shell indicated by 12a in FIG. 2 of the accompanying drawings becomes necessary. The undercutting process, as is known, requires the provision of a mechanism for pulling out a mold member 12 by rotating it or pulling out the mold member 12 by mechanically contracting it in the direction of its center axis. These mechanisms complicate the structure of the mold and it has been unavoidable that the manufacture of the mold requires much labor and the mold becomes expensive.

Thirdly, there is a case where the undercutting process is limited to the processing by the contraction of the mold member. It is a case where the undercut of the bore of the female shell is not of a screw-like shape but has grooves axis-symmetrical with respect to the center axis of the shell. In this case, dimensions having taken into account the mold space for providing therein a complicated mechanism called contraction are required of the bore of the female shell. This has limited the attempt to reduce the dimensions of the undercut bore of the female shell as well as the design the product. Further, a camera's lens barrel having a male side barrel for holding a lens optical system, etc. and a female side barrel mating with the male side barrel, characterized in that a cylindrical portion is formed and welded by a soluble or grindable resin material at one end of the female side barrel made of a metal material or a resin material, and then the female side barrel in which said cylindrical portion has been formed and welded is used as a jig for molding together with said cylindrical portion to pour the resin material of the male side barrel into the cylindrical portion and the interior of the female side barrel and thereby mold the male side barrel, whereafter said cylindrical portion is removed by dissolution or grinding and the female side barrel is mated with the male side barrel is known from Japanese Patent Application Laid-Open No. 8508/1982.

The method of making the lens barrel disclosed in the above-mentioned patent application includes the step of forming the cylindrical portion of a soluble or grindable resin material, and this leads to the complication of the structure of the mold and the structure of the molding material.

SUMMARY OF THE INVENTION

It is an object of the present invention to provide a method of forming a gap between a male shell and a female shell without utilizing the molding contraction of resin.

It is another object of the present invention to provide a method of manufacturing a lens barrel unit comprising a male shell and a female shell by coating the outer periphery of the male shell, especially the effective mating portion thereof with the female shell to be molded with a film consisting of a soluble material, and molding the female shell on the coated male shell.

It is still another object of the present invention to provide a method of manufacturing a lens barrel unit in which the clearance between the male shell and the female shell can be adjusted as desired and the magnitude of rotational torque can be set as desired.

It is yet still another object of the present invention to provide a three-layer rotational member in which helicoids are provided on the inner periphery and the outer periphery and an inner barrel member and an outer barrel member are brought into meshing engagement inside and outside a double helicoid shell having the inner peripheral helicoid and the outer peripheral helicoid, and a method of manufacturing the same.

It is a further object of the present invention to provide a method of manufacturing a rotational member unit which can more accurately ensure the dimensions of the mating gap of the mating portion between an inner shell and an outer shell helicoid-coupled to each other.

It is still a further object of the present invention to provide a manufacturing method which can achieve the above object by winding or fixedly fitting a sheet-like or cylindrical soluble material on or to the threadably engaging portion or the rotationally engaging portion of the shell member.

BRIEF DESCRIPTION OF THE DRAWINGS

FIGS. 11 to 15A and 15B illustrate the process of manufacture of the double helicoid barrel unit.

FIG. 11 is a cross-sectional view of a helicoid shell as an intermediate shell made in advance.

FIG. 12 is a cross-sectional view of the essential portions of a metal mold.

FIG. 14 is a cross-sectional view of a molded article molded by the metal mold shown in FIG. 12.

FIG. 15A is a fragmentary cross-sectional view of a double helicoid barrel unit with a soluble film left thereon.

FIG. 15B is a fragmentary cross-sectional view of the double helicoid barrel unit with the soluble film removed therefrom.

FIG. 18 shows a sheet-like soluble material as it is wound on the outer periphery of a helicoid member 16.

FIG. 19 illustrates the step of press-molding a helicoid member 16 having a soluble material wound thereon.

FIG. 20 shows the helicoid member 16 as it has been taken out from the pressing step shown in FIG. 19.

FIG. 21 is a cross-sectional view of the essential portions of the metal mold of a molding machine.

FIG. 22 is a cross-sectional view of a molded article taken out after having been molded by the molding machine of FIG. 5.

DESCRIPTION OF THE PREFERRED EMBODIMENTS

Figure 3:
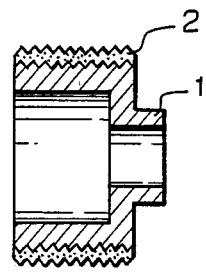
FIGS. 3 to 6 are cross-sectional view of an embodiment of the present invention.

FIGS. 3 to 6 show an embodiment of the present invention. FIG. 3 is a view showing a male shell 1 having a thread on the outer periphery thereof and having a soluble film 2 to be described formed on the further outer periphery thereof.

Figure 4:
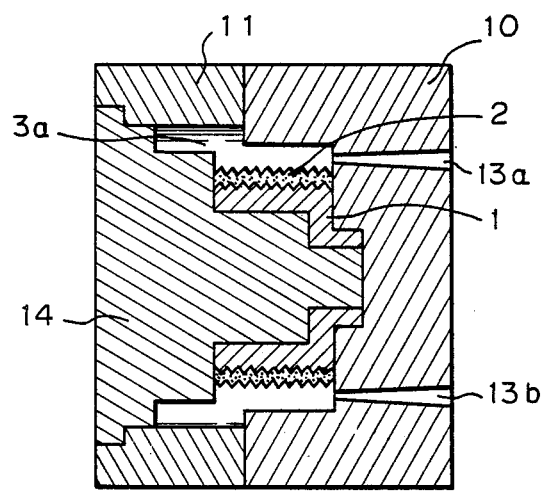

FIG. 4 shows a mold structure for molding a female shell on the basis of the male shell having the soluble film on the outer periphery thereof. Reference numeral 1 designates the male shell held in the mold and having the soluble film 2 on the outer periphery thereof. Reference character 3a denotes a cavity for forming the female shell. The cavity 3a is formed by mold members 1, 10, 11, 14 and soluble film 2. Designated by 13a and 13b are runners for pouring resin into the cavity 3a therethrough.

Figure 5:
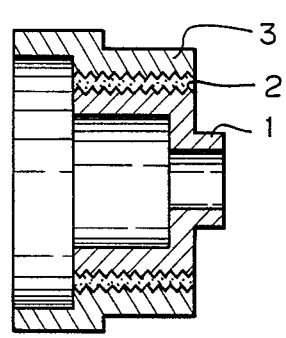

FIG. 5 shows the female shell as it has been completely molded and removed from the mold. The male shell 1 and the female shell 3 are made integral with each other with the soluble film 2 interposed therebetween.

Figure 6:
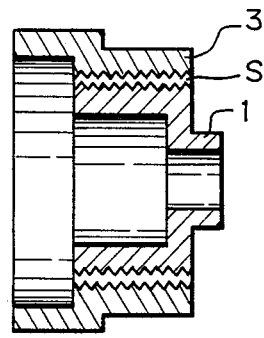

FIG. 6 shows a completed unit shell. As shown, the soluble film is removed and a minute gap S is formed between the male shell 1 and the female shell 3.

A manufacturing process according to the present embodiment will now be described. The premanufactured male shell 1 formed of a metal material (such as stainless steel or aluminum alloy) or a resin material (polycarbonate resin) is immersed in a solution of a soluble material. In this case, only the outer peripheral threaded portion of the male shell is immersed in the solution. The male shell is rotated so that a film is attached to the entire circumference of the thread, whereafter the male shell is slowly taken up. Subsequently, this male shell is dried by hot air to thereby solidify the thin film of the soluble material attached to the outer periphery of the thread. The article obtained through the above-described process is what is shown in FIG. 3.

The thickness of the film can be controlled by the viscosity of the solution of the soluble material and the conditions under which the male shell 1 is taken up from the solution. The film forming method is not limited to the immersion.

Subsequently, the male shell 1 formed by solidifying the soluble film is mounted into a shaping mold as shown in FIG. 4 and the female shell 3 is molded. The female shell 3 is formed with a thread in the bore thereof, the thread having been transferred from the soluble film. In this case, the female shell is molded on the basis of the male shell and therefore, an undercut processing mechanism for the bore thread of the female shell which has heretofore been necessary is not required at all.

The molded article of which the above-described molding has been completed and which has been removed from the mold is what is shown in FIG. 5.

Subsequently, there is obtained a unit shell by subjecting the molded article of FIG. 5 to a predetermined treatment to dissolve and remove the soluble film 2 and form the gap S shown in FIG. 6.

The material used for the soluble film may be, for example, neutral polyose in which water-soluble moltotriose is regularly $\alpha$-1.6 coupled. This is because this material after formed as a structural member has a heat resisting property and strength withstanding injection molding and further has a water-soluble characteristic. Removal of the film 2 of the molded article of FIG. 5 is accomplished by immersing the molded articles 1, 2 and 3 in water and stirring the water. In the lens barrel of the present embodiment, to secure the accuracy of the thread, it is necessary to minimize the gap between the male shell and the female shell, for example, to a minute dimension of about 1/100 to 10/100 mm and therefore, it is also necessary to make the thickness of the film itself minute. Fortunately, by this reason, the film is thin and the amount of the material of the film is minute and thus, the dissolution and removal thereof can be accomplished within a short time.

On the other hand, the amount of the gap S shown in FIG. 6 can be suitably set by the thickness of the soluble film, the selection of the resin material in the formation of the female shell 3, and the molding conditions, and therefore, the back-lash when the male shell and the female shell are repeatedly moved relative to each other can be minimized and optical accuracy and physical accuracy such as moderate operation weight can be sufficiently satisfied.

Figure 7:
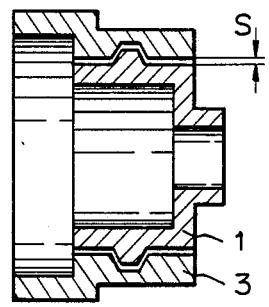
FIGS. 7 to 9 are cross-sectional views of a unit shell to which the present embodiment is applied.
Figure 8:
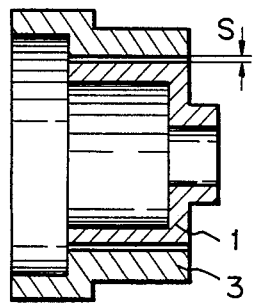
Figure 9:
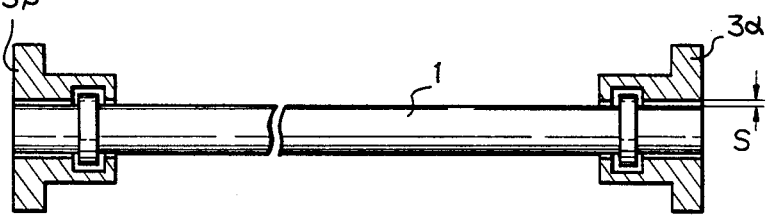

The present embodiment is not restricted to threadably mating unit shells, but can easily be applied also to the axis-symmetrical mating unit shells partly shown in FIGS. 7 and 8 or to a unit comprising a shaft and a bearing as shown in FIG. 9.

According to the present embodiment, the gap between the male shell and the female shell can be formed without resorting to the molding contraction of resin, and this leads to the following advantages:

(1) Even if the female shell is molded on the basis of the male shell, there can be obtained a unit shell which satisfies engagement accuracy and physical accuracies;

(2) Any of a resin material and a metal material can be selected for the male shell. Thus, the strength selection range of the male shell becomes wide and the wide use of the unit shell can be ensured;

(3) Even in a case where in a female shell shaping mold, the bore of the female shell has an undercut shape such as a thread, the undercut processing mechanism therefor is not required at all, and the mold can be made inexpensively; and (4) In the dimensions of the bore of the female shell, the frame limited by the undercut processing mechanism of the female shell shaping mold is eliminated, and the female shell can be molded even to smaller dimensions and as compared with the prior art, free product designing becomes possible.

FIGS. 10 to 17 show a case where a three-layer rotational member including a double helicoid shell is manufactured in accordance with the present invention.

Figure 10:
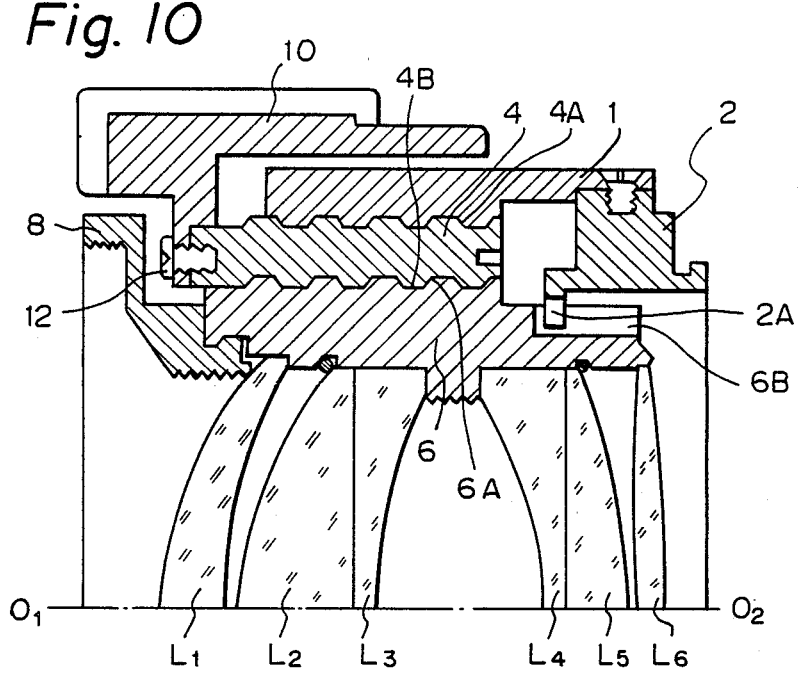
FIG. 10 shows a lens barrel incorporating therein a double helicoid barrel unit made by a manufacturing method according to the present invention.

FIG. 10 shows a lens barrel incorporating therein a double helicoid shell unit made by the present invention. In FIG. 10, reference numeral 1 designates a fixed shell, reference numeral 2 denotes a mount member screw-coupled to the fixed shell 1, and reference numeral 4 designates a double helicoid shell formed with helicoids on the inner and outer peripheries thereof. The outer peripheral helicoid 4A is threadably engaged with the fixed shell, and the inner peripheral helicoid 4B is threadably engaged with the helicoid 6A of a lens holding shell 6. A rectilinear key way 6B is formed on the outer periphery of the lens holding shell 6, and a key member 2A fixed to the mount member 2 is engaged with the key way 6B. L1–L6 designate focusing lenses held in the lens holding shell 6. Reference numeral 8 denotes an outer ring fixed to the fore end of the lens holding shell 6. Reference numeral 10 designates a distance ring fixed to the fore end of the double helicoid shell 4 by means of a screw 12. The lens barrel of the above-described construction is such that rotation of the distance ring 10 about the optic axis, causes rotation of the double helicoid shell and the lens holding shell 6 is rectilinearly moved in a direction parallel to the optic axis $O_1$–$O_2$ by the relation between the key way and the key, whereby focusing is accomplished.

FIGS. 11 to 15B show an example of the case where, of the double helicoid shell unit comprising the fixed shell 1 and lens holding shell 6 of the lens barrel shown in FIG. 10 and the double helicoid shell 4, the fixed shell 1 and the lens holding shell 6 are manufactured at the same time by a single metal mold.

Figure 11:
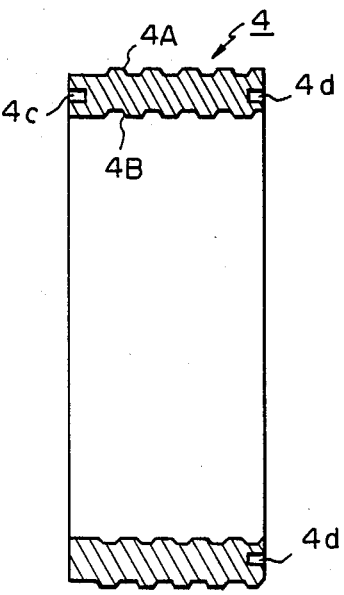

Of the above-described lens unit, the double helicoid shell 4 is made of a metal material or a resin material in advance as shown in FIG. 11. One end of the helicoid shell 4 is provided with a screw hole 4C for the screw 12 and a plurality of holding holes 4d which will be described later. The helicoid shell 4 made in advance is held within the metal mold shown in FIG. 12, and before it is held within the metal mold, a soluble solvent 14 is applied to the outer peripheral helicoid portion 4A of the helicoid shell 4, as shown in FIGS. 13A and 13B. FIG. 13B shows a fragmentary cross-section in which the solvent 14 is applied to the outer periphery of the helicoid portion 4A.

The soluble solvent 14 is dried by applying or injecting a neutral polyose solution in which moltotriose is regularly $\alpha$-1.6 coupled, thereby making the thickness of the film constant. The thickness of the film is set so as to enable the helicoid coupling of the helicoid shell 4 and the lens holding shell 106 to be smoothly accomplished.

Figure 12:
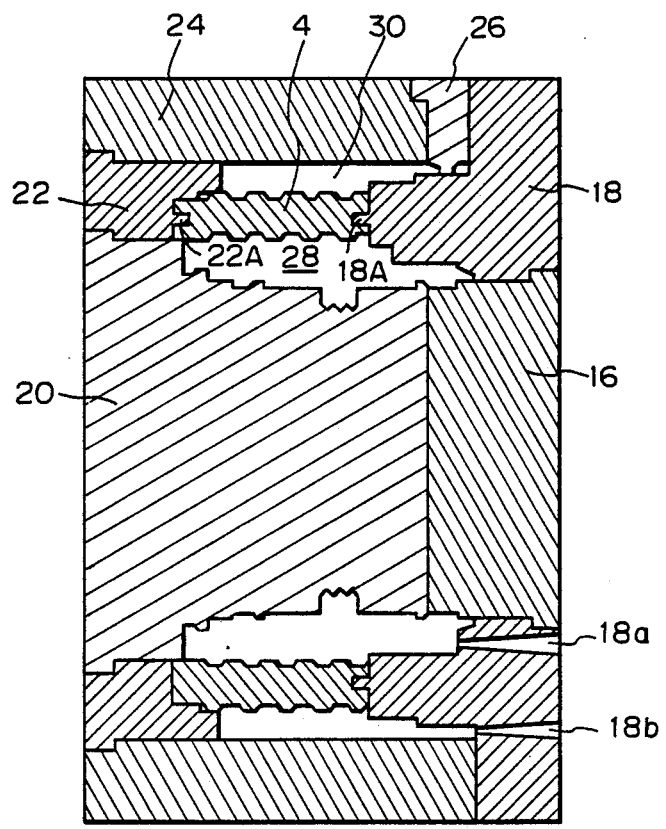
Figure 13A:
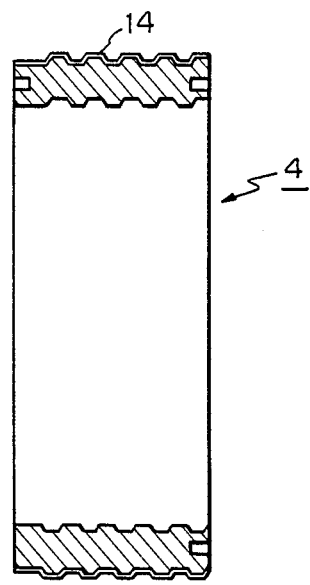
FIG. 13A is a cross-sectional view of a helicoid shell 104 having its outer periphery coated with a soluble film.
Figure 13B:
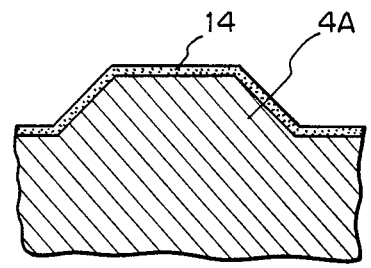
FIG. 13B is an enlarged fragmentary view of the helicoid shell of FIG. 13A.

The helicoid shell 4 coated with the soluble film 14 is held within the metal mold shown in FIG. 12. In FIG. 12, reference numeral 16 designates a fixed side, reference numeral 18 denotes a fixed side mold member, reference numeral 20 designates a movable side, reference numeral 22 denotes a mold member for holding the helicoid shell 4, reference numeral 24 designates a movable side mold member, and reference numeral 26 denotes a mold member for the screw hole of the fixed shell.

The helicoid shell 4 is held within said metal mold by a holding pin 22A extending from the holding mold member 22 and a holding pin 18A extending from the fixed side mold member 18.

In the metal mold, inside and outside the helicoid shell 4, a hollow ring-like clearance 28 is formed by the helicoid shell 4 and the mold members 16, 18, 20, 22 and a hollow ring-like clearance 30 is formed by the mold members 18, 22, 24, 26. A gate 18a communicating with said clearance 28 and a gate 18b communicating with said clearance 30 are provided in the fixed side mold member 18. Through the gates 18a and 18b of the metal mold of FIG. 12, a molten resin material is poured into said clearances 28 and 30 from an ejection unit, not shown, connected to the mold.

Said clearances 28 and 30 are filled with the molten resin material to form molded articles. Thereafter, the metal mold is cooled to thereby cool the resin material. After the molten resin has been cooled, the movable side mold member is moved and the helicoid shell 4 and the fixed shell 1 and the lens holding shell 6 as the inner and outer molded articles of the helicoid shell 4 are taken out of the mold.

In the metal mold shown in FIG. 12, the inner peripheral side of the clearance 30 is filled with molding resin through the soluble film 14 applied to the helicoid portion 4A of the helicoid shell 4.

Figure 14:
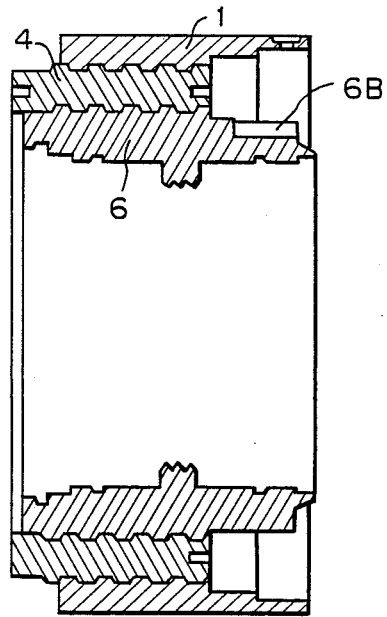

FIG. 14 shows a fragmentary cross-sectional view of the helicoid shell 4, the lens holding shell 6 and the fixed shell 1.

Figure 15A:
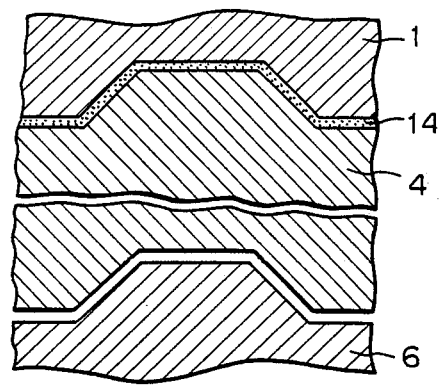
Figure 15B:
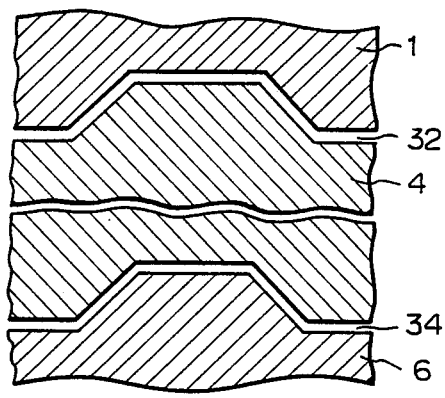
Figure 17:
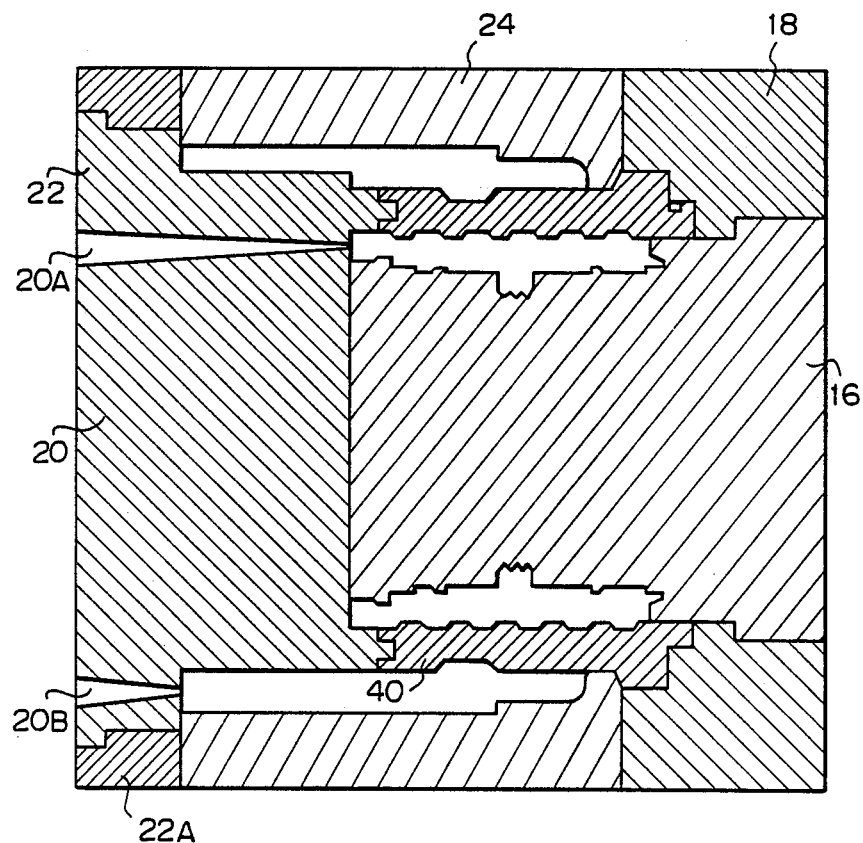

After the molded article shown in FIG. 15A is taken out of the metal mold, the molded article is immersed in water to thereby dissolve and remove the moltotriose 14 which is the soluble film. FIG. 15B shows the cross-section after the dissolution and removal.

By removal of the soluble film 14, a clearance 32 is formed between the helicoid shell 4 and the fixed shell 1 (FIG. 15B). Also, between the helicoid shell 1 and the lens holding shell 6, the lens holding shell 6 contracts diametrically thereof due to the cooling and contracting actions of the lens holding shell 6 and thus, a clearance 34 is formed between the lens holding shell 6 and the helicoid shell (FIG. 15B).

These clearances 32 and 34 permit the lens holding shell 6 and the fixed shell 1 inside and outside the helicoid shell 4 to be smoothly rotated.

Figure 16:
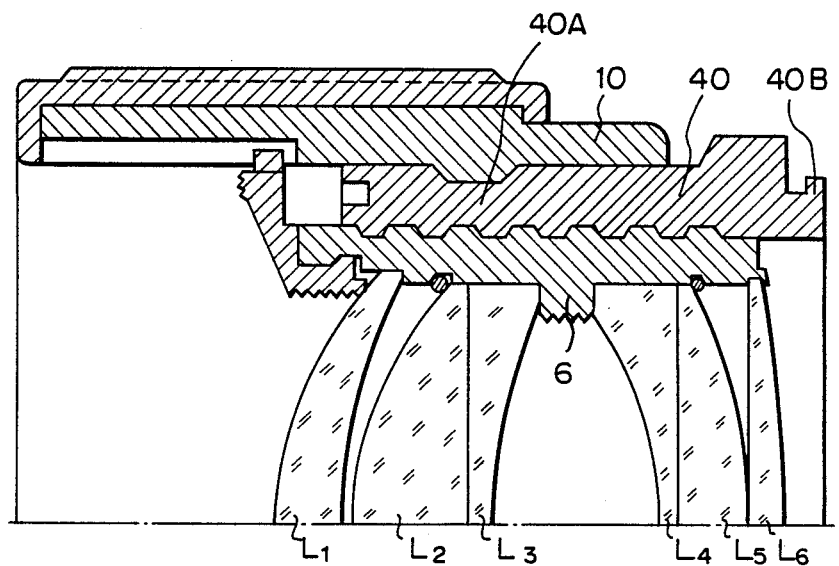
FIGS. 16 and 17 show another embodiment of the present invention.

The double helicoid shell unit comprising the helicoid shell 4, the fixed shell 1 and the lens holding shell 6 described with reference to FIGS. 11 to 15A and 15B can suitably determine said clearance 32 by choosing the thickness of said film 4. Accordingly, even in a case where the double helicoid shell unit is incorporated into the lens barrel shown in FIG. 11, rotation of the operating ring 10 causes smooth rotation of the double helicoid shell 4. The embodiment of FIGS. 11 to 15A and 15B has been shown as an example in which the helicoid shell 4 is short, but again in a case where a shell 40 in which as shown in FIG. 16, a double mating portion 40A with the inside of which is threadably engaged the lens holding shell 6 and with the outside of which mates the distance operating ring 10 is formed integrally with a mount portion 40B such as a bayonet mount for mounting the lens barrel on a camera is used as the fixed shell, the fixed shell 40 may be prepared in advance and held in the metal mold of FIG. 17 in a manner similar to that shown in FIG. 12, whereby the fixed shell can be made.

According to the present invention, as described above, an inner shell and an outer shell are molded at a time by a single metal mold inside and outside the intermediate shell made in advance and the unsmoothness of rotation caused by the contractive tightening created between the outer shell and the intermediate shell as a result of the contraction caused by the molding work can be solved, and at least three parts can be molded and assembled in a single step and thus, a great reduction in the manufacturing cost by a decrease in the number of shaping metal molds and a reduction in the working process becomes possible.

Particularly, according to the present invention, by adopting a construction in which the outer periphery of the intermediate shell (helicoid shell 4) used as the metal mold member is coated with the soluble film 14, the clearance between the intermediate shell and the outer shell can be adjusted to thereby ensure the rotation of the helicoid coupling portion and permit the trouble of post-working the article because of the unsmoothness of the rotational portion to be omitted.

FIGS. 18 to 21 show another embodiment of the present invention. This embodiment is an example in which the dimensions of the gap between the threadably engaging portion and the rotationally engaging portion are obtained with higher accuracy. A case where the helicoid unit (the helicoid member 4, the fixed shell 1 and the lens holding shell 6) of the lens barrel in the embodiment of FIG. 10 is manufactured will hereinafter be described as the description of the present embodiment.

Figure 18:
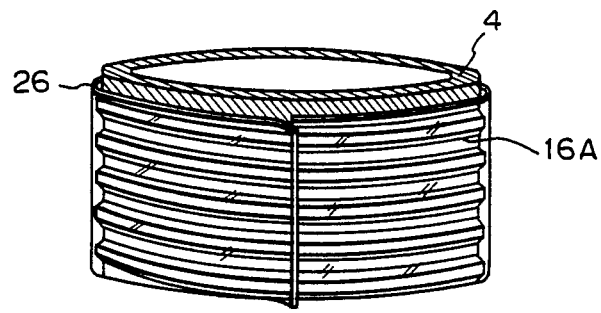
FIGS. 18 to 22 show an embodiment using a sheet-like or cylindrical soluble material.

FIG. 18 shows a soluble sheet material 26 as it is wrapped around the double helicoid 4. The soluble sheet material 26 may be a material in which moltotriose is $\alpha$-1.6 coupled (trade name: Pullulan) and which is made into the form of a sheet. This sheet is wrapped around the helicoid portion 4A of the helicoid 4 made of a metal or synthetic resin so that the opposite ends thereof slightly overlap each other. The soluble sheet material 26 is water-soluble and therefore, if the opposite ends thereof are wetted with water and then pressed and dried, the soluble sheet material will become a cylindrical member.

The helicoid member 4 with the soluble sheet material 26 wrapped around it is then sent to a pressing step, at which the cylindrical member of the soluble sheet material is worked so as to be entrained along the helicoid surface of the helicoid member 4.

Figure 19:
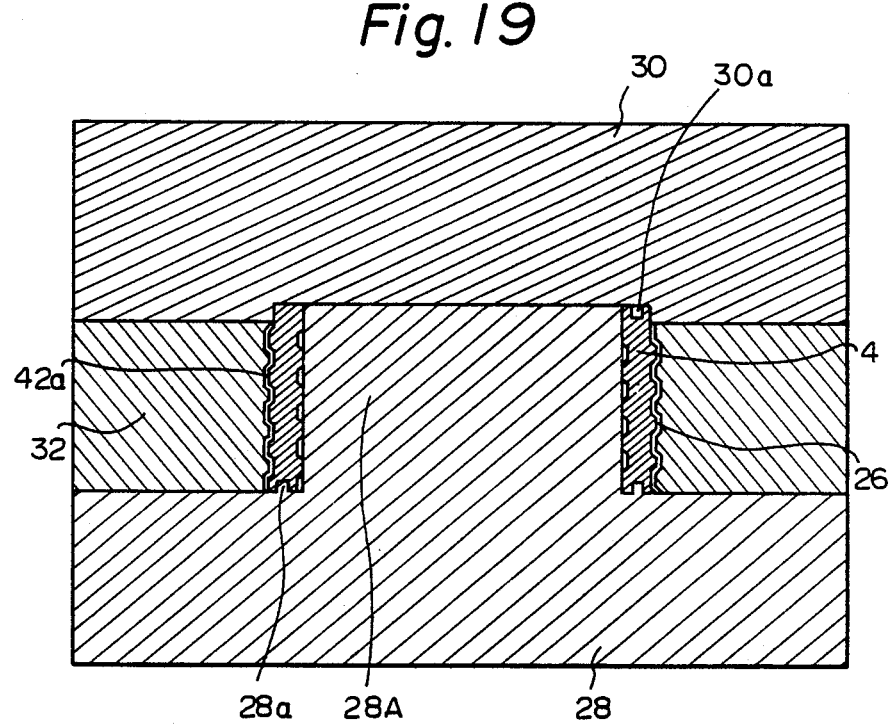
Figure 20:
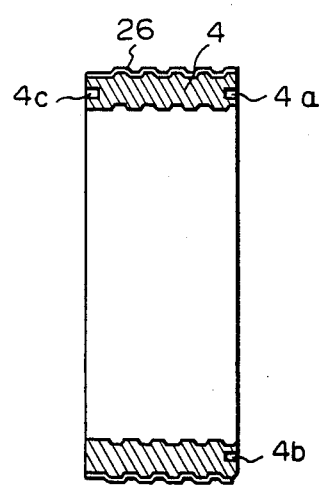

As shown in FIG. 19, the helicoid member 4 with the soluble sheet material 26 wrapped around it is fitted into the cylindrical portion 28A of a lower press mold 28 and pressed from above it by an upper mold 30. The helicoid member 4 is engaged with pins 28a and 30a for holding the lower and upper molds in holding holes provided in the end surface of the cylinder of the helicoid and is fixedly positioned thereby. Reference numeral 32 designates a slide piece for pressing the cylindrical member 26 against the outer peripheral surface of the helicoid member 4. The slide piece 32 is divided into a plurality of parts, and the inner peripheral surface of the slide piece 32 is formed with helicoid teeth 32a which are in meshing engagement with the outer peripheral helicoid 4A of the helicoid member 4. The divided slide piece 32 is designed so as to be moved radially relative to an axis O by drive means, not shown, and the slide piece 32 is moved in the direction of the axis O relative to the helicoid member 4 fixed to the lower mold 28 and the upper mold 30, by said drive means. By this process, the soluble cylindrical member 26 on the outer periphery of the helicoid member 4 is pressed and fixed along the surface of the outer peripheral helicoid tooth portion 4A of the helicoid member 4 (see FIG. 20).

Figure 21:
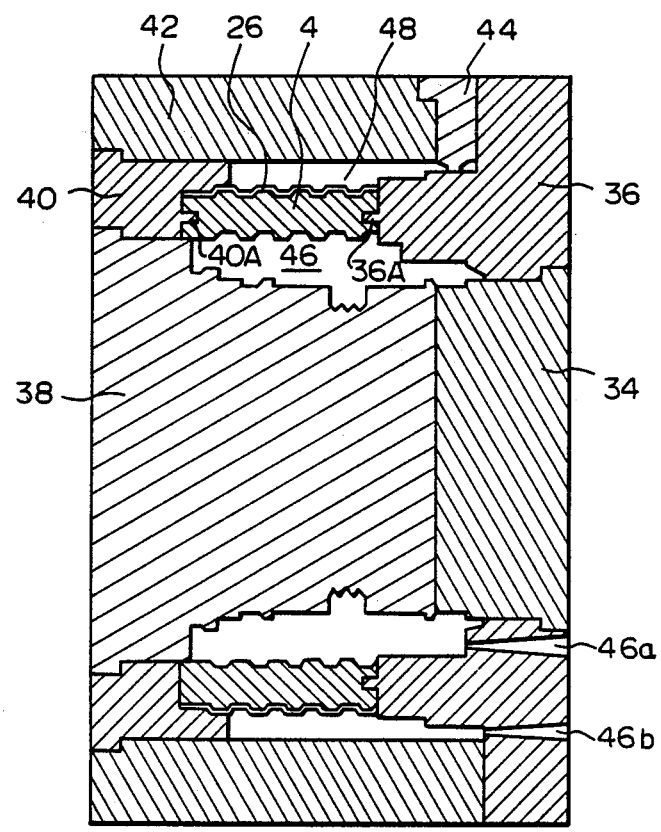

The helicoid shell 4 coated with the soluble film 26 is held in the metal mold shown in FIG. 21. In FIG. 21, reference numeral 34 designates a fixed side core, reference numeral 36 denotes a fixed side mold member, reference numeral 38 designates a movable side core, reference numeral 40 denotes a mold member holding the helicoid shell 16, reference numeral 42 designates a movable side mold member, and reference numeral 44 denotes a mold member for the screw hole of the fixed shell.

The helicoid shell 4 is held within said metal mold by a holding pin 40A extending from the holding mold member 40 and a holding pin 36A extending from the fixed side mold member 36.

Within the metal mold, inside and outside the helicoid shell 4, there is formed a hollow ring-like clearance 46 by the helicoid shell 4 and the mold members 34, 36, 38, 40 and there is also formed a hollow ring-like clearance 48 by the mold members 36, 40, 42, 44. In the fixed side mold member 36, there is are provided a gate 46a communicating with the clearance 46 and a gate 46b communicating with the clearance 48. A molten resin material is poured into the clearances 46 and 48 from an unshown injection unit connected to the metal mold, through the gates 46a and 46b of the metal mold of FIG. 21.

The clearances 46 and 48 are filled with the molten resin material to make a molded article. Thereafter, the metal mold is cooled to thereby cool the resin material. After the cooling of the molten resin, the movable side mold member is moved, whereby as shown in FIG. 22, the helicoid shell 4, and the fixed shell 1 and the lens holding shell 6 as the inner and outer molded articles of the helicoid shell 4 are taken out of the mold.

In the metal mold shown in FIG. 21, the inner peripheral side of the clearance 48 is filled with molding resin through the soluble film 26 covering the helicoid portion 4A of the helicoid shell 4.

Figure 22:
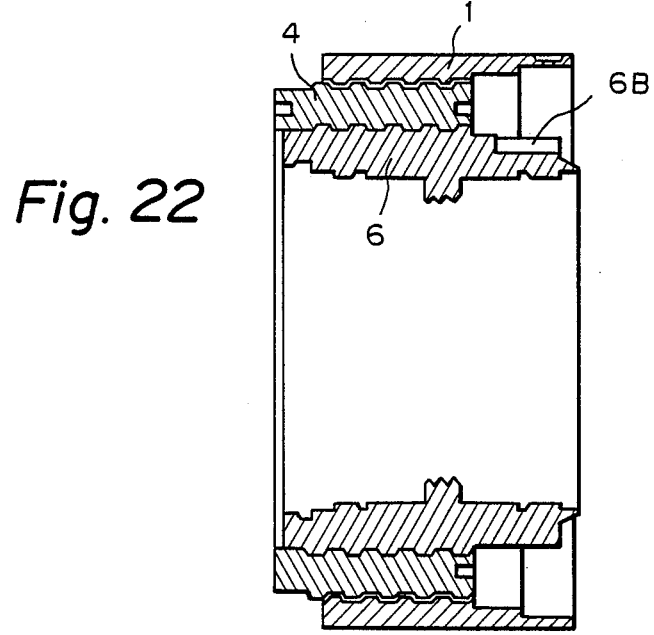

The molded article shown in FIG. 22 is taken out of the metal mold, and thereafter is immersed in water, whereby the moltotriose 26 of the soluble film is dissolved and removed.

By the soluble film 26 being thus removed, a clearance is formed between the helicoid shell 4 and the fixed shell 12. Also, between the helicoid shell 4 and the lens holding shell 18, the lens holding shell 18 is contracted diametrically thereof by the cooling and contracting action of the lens holding shell 18, whereby a clearance is formed between the lens holding shell and the helicoid shell.

This clearance enables the lens holding shell 6 and the fixed shell 1 inside and outside the helicoid shell 4 to be smoothly rotated.

The double helicoid shell unit comprising the helicoid shell 4, the fixed shell 1 and the lens holding shell 6 described with reference to FIGS. 11 to 15A and 15B can suitably determine the clearance 32, 34 by choosing the thickness of the film 14. Accordingly, even in a case where the double helicoid shell unit is incorporated into the lens barrel shown in FIG. 11, rotation of the operating ring causes smooth rotation of the double helicoid shell 4.

Description will now be made of the combination of the soluble material according to the embodiment of the present invention and the materials of the various members of the helicoid unit.

The soluble material must be a material which will permit uniform thin films to be formed on the inner and outer peripheries of the helicoid 4 and which is suited for the molding conditions (such as the molding temperature and the molding pressure) when inner and outer shells are molded inside and outside the helicoid 4 and which can be completely dissolved and removed in the dissolving step after the inner and outer shells are molded inside and outside the helicoid 4.

The soluble material which satisfies the above-mentioned conditions includes natural polyose and synthetic resin materials. For the natural polyose, use may be made of the aforementioned substance in which moltotriose is α-1.6 coupled (trade name: Pullulan).

Where moltotriose is used as the soluble material, the material suitable for the helicoid member 4 is aluminum (Al) as a metal or polycarbonate resin (PC resin) as resin, and the material of the fixed shell 1 and the lens holding shell 6 may be polycarbonate resin or acryl nitrile butadiene styrene copolymer resin (ABS resin). The solvent for dissolving the soluble material 14 may be water.

Where a synthetic resin material is employed as the soluble material, polycarbonate resin or polysulphon resin may be used as the soluble material 14, aluminum or polyphenylene sulfide (PPS resin) is suitable for the helicoid member 4, and nylon resin produced by the reaction injection molding method may be used as the material of the fixed shell 1 and the lens holding shell 6. The solvent in the case of such combination of these materials may suitably be methyl ethyl ketone (MEK).

Figure 1:
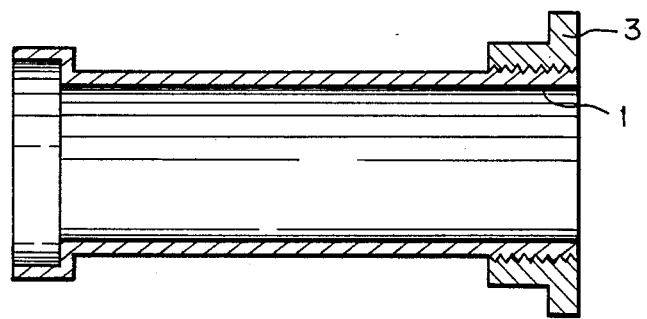
FIG. 1 is a cross-sectional view of a unit shell in which the male shell is thin-walled and long.
Figure 2:
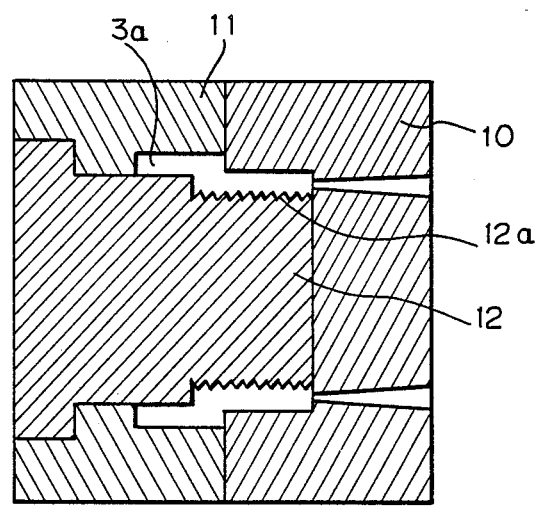
FIG. 2 is a cross-sectional view of a female shell shaping mold according to the prior art.

According to the present invention, as described above, in a method of manufacturing a rotational member unit comprising a combination of a plurality of rotational shells, a soluble material in the form of a sheet is wound around a shell of the rotational member unit, and the wound soluble material and a helicoid member are fixed within the mold of a molding machine to thereby mold an inner shell (a lens holding shell) and an outer shell (a fixed shell) on the inner and outer peripheries of the helicoid member, whereafter the soluble material is dissolved, whereby the helicoid member, the fixed shell and the lens holding member can be manufactured for each unit, and without requiring the post-working such as adjusting the molded article, there can be obtained a rotational member unit in which the rotational portions, especially, the helicoid meshing portions, are in good meshing engagement with each other. Further, according to the present invention, the soluble material such as Pullulan is made into the form of a sheet or a cylindrical thin film, and by the pressing step shown in FIG. 2, the soluble material is pressed against the helicoid tooth surface of the helicoid member and is fixed along the shape of the tooth surface, whereby the soluble material is held in intimate contact with the helicoid tooth surface and thus, the dimensions of the clearance between the helicoid member and the outer shell (the fixed shell) can be accurately set and good meshing engagement of the helicoid can be provided

We claim:

1. A method of manufacturing a rotational cylinder unit, which comprises a first rotational member having rotationally engaging portions in outer and inner peripheral portions, a second rotational member for rotationally engaging the outer peripheral portion of the first rotational member, and a third rotational member for rotationally engaging the inner peripheral portion of the first rotational member, and which is constructed by engaging the first, second and third rotational member, comprising the steps of:

fixing a clearance generating member made of soluble material on the outer periphery of the first rotational member;

forming a mold to generate the second and third rotational members, wherein the mold cooperates with the first rotational member fixed with the clearance generating member and has a formation member for forming outer and inner cavities separated by the first rotational member to mold the second and third rotational members, respectively;

injecting resin into the cavities to form the second and third rotational members;

generating a clearance between the rotationally engaging portions of the first rotational member and the second rotational member by eliminating the clearance generating member therebetween to enable rotational movement between the first and second rotational members, and wherein a clearance between the rotationally engaging portions of the first rotational member and the third rotational member is formed by shrinkage to enable rotational movement therebetween.

2. A method according to claim 1, wherein said fixing step further comprises:

coating the first rotational member with the soluble material, and allowing the material to dry to form the clearance generating member, wherein the soluble material comprises a neutral polyose solution where water-soluble moltotriose is regularly −1.6 coupled.

3. A method according to claim 2, wherein the clearance generating step further comprises:

immersing the rotational unit containing the clearance generating member in water to dissolve and eliminate the clearance generating member.

4. A method according to claim 1, wherein said fixing step further comprises:

winding a film of the material around the periphery of the threaded portion or rotationally engaging portion of the male rotational member;

compressing the film onto the male rotational member to form the clearance generating member.

5. A method according to claim 4, wherein the clearance generating step further comprises:

immersing the rotational unit containing the clearance generating member in water to dissolve and eliminate the clearance generating member.

* * * * *

UNITED STATES PATENT AND TRADEMARK OFFICE
CERTIFICATE OF CORRECTION

PATENT NO. : 4,917,846

DATED : April 17, 1990

INVENTOR(S) : Hironori Takase, et al.

It is certified that error appears in the above-identified patent and that said Letters Patent is hereby corrected as shown below:

COLUMN 2:

Line 2, "design" should read --design of--.

COLUMN 3:

Line 1, "view" should read --views--.

COLUMN 10:

Line 9, "provided" should read -- provided.--

Line 19, "member," should read -- members,--.

Line 50, "-1.6 coupled." should be -- α -1.6 coupled.--.

Line 60, "male rotational member" should read --first rotational member--,

UNITED STATES PATENT AND TRADEMARK OFFICE
CERTIFICATE OF CORRECTION

PATENT NO. : 4,917,846

DATED : April 17, 1990

INVENTOR(S) : Hironori Takase, et al.

It is certified that error appears in the above-identified patent and that said Letters Patent is hereby corrected as shown below:

COLUMN 10:

Line 61, "male rotational member" should read
--first rotational member--.

This certificate supersedes Certificate of Correction issued January 21, 1992.

Signed and Sealed this

Third Day of March, 1992

Attest:

*Attesting Officer*

HARRY F. MANBECK, JR.

*Commissioner of Patents and Trademarks*